United States Patent
Atwater

[19]

[11] Patent Number: 6,118,251

[45] Date of Patent: Sep. 12, 2000

[54] BATTERY DEPASSIVATION AND CONDITIONING METHOD AND APPARATUS

[75] Inventor: Terrill B. Atwater, North Plainfield, N.J.

[73] Assignee: The United States of America as represented by the Secretary of the Army, Washington, D.C.

[21] Appl. No.: 09/246,215

[22] Filed: Jan. 27, 1999

[51] Int. Cl.[7] ...................................................... H02J 7/00
[52] U.S. Cl. ............................................................ 320/131
[58] Field of Search .................................... 320/100, 129, 320/130, 131

[56] References Cited

U.S. PATENT DOCUMENTS

| | | | |
|---|---|---|---|
| 4,730,153 | 3/1988 | Breting et al. | 320/139 |
| 4,795,537 | 1/1989 | Timewell | 205/705 |
| 4,839,248 | 6/1989 | Magnussen, Jr. et al. | 320/139 |
| 4,885,523 | 12/1989 | Koenck | 320/131 |
| 5,182,509 | 1/1993 | Simmonds | 320/131 |
| 5,196,779 | 3/1993 | Alexandres et al. | 320/131 |
| 5,677,612 | 10/1997 | Campagnuolo et al. | 320/141 |
| 5,905,363 | 5/1999 | Helbing et al. | 320/131 |

Primary Examiner—Peter S. Wong
Assistant Examiner—Pia Tibbits
Attorney, Agent, or Firm—Michael Zelenka; John M. O'Meara

[57] ABSTRACT

The present invention provides a unique method for safely and effectively removing the passive layer from the anode of a battery, so that the battery will function safely and properly. Batteries that are stored for long periods of time develop passive layers over their anodes. The present invention removes this passive layer by applying a series of controlled electric pulses to the anode. When a controlled electric charge discharges at the anode, it removes a portion of the passive layer at the discharge region of the anode. Each pulse is separated from a subsequent pulse by a resting time period. This resting period allows the anode to recover, so that the subsequent pulse will discharge at another location. These pulses are applied to the anode until the entire passive layer is safely removed, thus allowing the battery to function properly.

10 Claims, 8 Drawing Sheets

FIG. 6

| TIMING SIGNAL FROM CLOCK | STATE OF FLIP FLOP a | STATE OF FLIP FLOP b | OUTPUT LOGIC SIGNAL |
|---|---|---|---|
| 0 | 1 | 0 | 0 |
| 1 | 0 | 1 | 1 |
| 0 | 0 | 1 | 1 |
| 1 | 0 | 0 | 0 |
| 0 | 0 | 0 | 0 |
| 1 | 1 | 0 | 0 |
| 0 | 1 | 0 | 0 |
| 1 | 0 | 1 | 1 |
| 0 | 0 | 1 | 1 |
| 1 | 0 | 0 | 0 |
| 0 | 0 | 0 | 0 |
| 1 | 1 | 0 | 0 |
| 0 | 1 | 0 | 0 |
| 1 | 0 | 1 | 1 |
| 0 | 0 | 1 | 1 |
| 1 | 0 | 0 | 0 |
| 0 | 0 | 0 | 0 |
| 1 | 1 | 0 | 0 |
| 0 | 1 | 0 | 0 |
| 1 | 0 | 1 | 1 |
| 0 | 0 | 1 | 1 |
| 1 | 0 | 0 | 0 |
| 0 | 0 | 0 | 0 |
| 1 | 1 | 0 | 0 |

BATTERY DEPASSIVATION AND CONDITIONING METHOD AND APPARATUS

GOVERNMENT INTEREST

The invention described herein may be manufactured, used, and licensed by or for the Government of the United States without paying any royalties to me.

FIELD OF THE INVENTION

This invention relates generally to electrochemical batteries, and in particular, to depassivating the anode of electrochemical batteries.

BACKGROUND OF THE INVENTION

Chemical passivation is a process where an inert, or passive, film is formed over the surface of a material. In lithium batteries, passivation occurs when an inert film is formed over the lithium anode. This film is the product of a chemical reaction between the lithium anode and the electrolyte that takes place when the battery not being discharged.

The passive film has a high ionic conductivity. Because the film is conductive, it is removed from the anode when the battery is discharged. However, when the battery is not being discharged, the passive film re-grows over the anode.

There are two main problems caused by the passive film. First, if the passive film is too large, the battery will not operate. Second, if the passive film is uneven, the battery will be a potential safety hazard.

First, if the battery is stored for a long time, the passive film will grow very large. If the passive film is too large, the amount of electric current needed to remove the film from the anode cannot be generated by the electrochemical potential of the cell. The large passive layer over the anode will prevent the battery from working.

Second, the initial growth of the passive film over the surface of the anode is consistent and even. However, as time passes, the growth of the film becomes uneven, due to local conditions of the anode and defects in the film. Accordingly, the conductivity of this uneven, non-homogeneous film is similarly uneven. The film's conductivity varies as the thickness of the film varies over the anode of the battery. Therefore, when the battery is discharged, the distribution of current over the anode will be uneven. The current will be concentrated at certain points of the anode. These concentrated points of current will be disconnected from each other and from other points of the anode. The current concentration and the anode disconnect can cause violent venting in lithium batteries.

There is a need for a device and a method which will remove the passive layer from the anode of a battery when the battery is inoperable.

There is a need for a device and a method which will safely remove the passive layer from the anode of a battery without causing anode disconnect or current concentration.

SUMMARY OF THE INVENTION

The present invention is a method for removing the passive layer from an anode of a battery by applying a series of controlled electric pulses to the passive layer on the anode. Each pulse is separated by a resting period so that the anode can recover from each discharge, thus causing each pulse to discharge at a unique region on the anode. The present invention includes a method, a device for implementing the method, a computer program product, and an article of manufacture, all for removing the passive layer from an anode.

BRIEF DESCRIPTION OF THE DRAWINGS

FIG. 6 shows the logic code used by the present invention.

DETAILED DESCRIPTION OF THE DRAWINGS

Figure 1A:
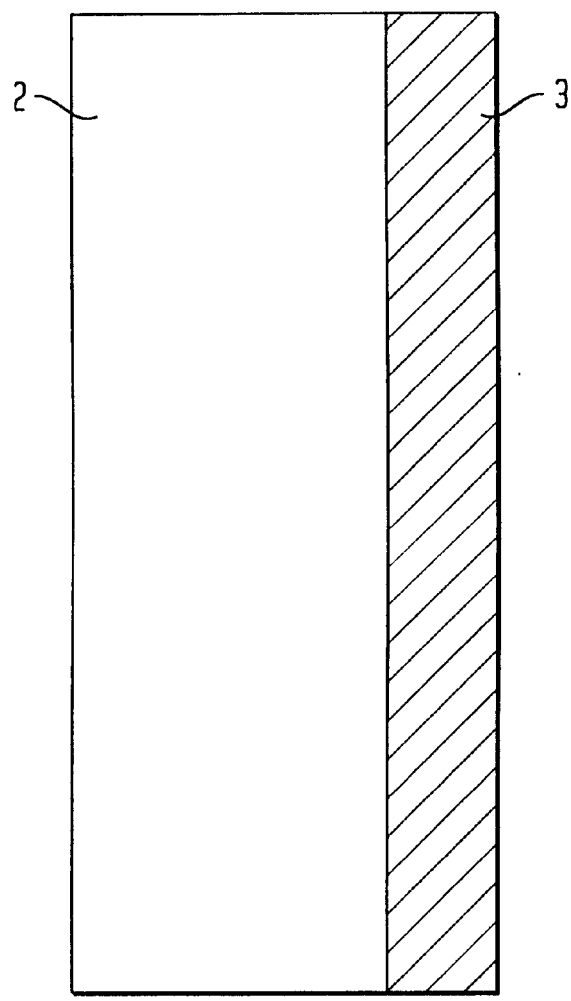
FIG. 1a shows an anode having a passive layer.
Figure 1B:
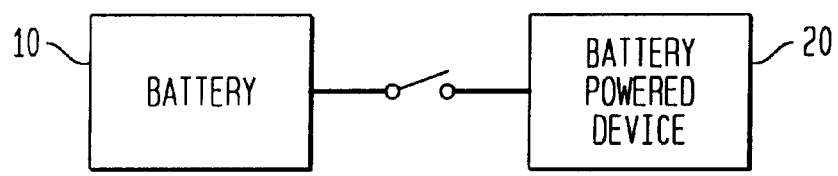
FIG. 1b shows the prior art for removing the passive layer.
Figure 1C:
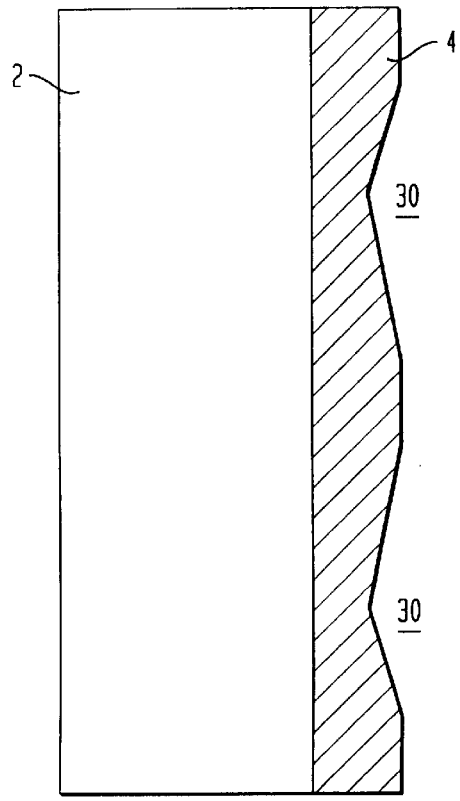
FIGS. 1c and 1d show anode disconnect and current concentration.
Figure 1D:
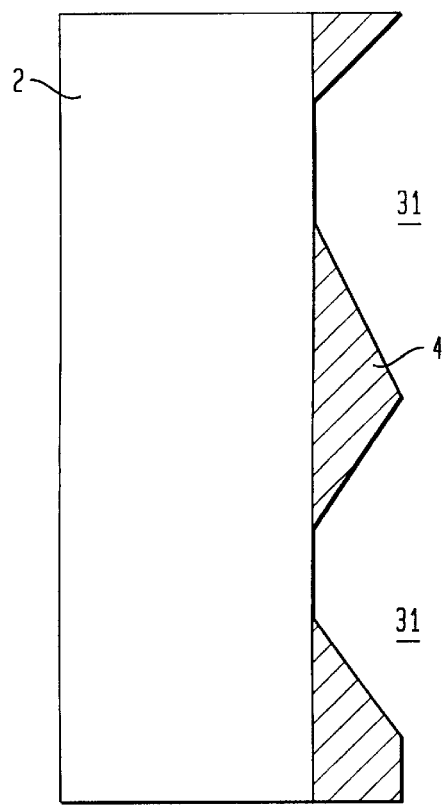

FIG. 1a shows passive film 3 on the battery's anode 2. FIG. 1b shows a prior art system for removing the passive layer 3 from the anode 2. The prior art is simply plugging the battery 10 into a device 20, and turning the device on and off. This prior art method of producing uncontrolled current at the anode from the battery itself suffers from two disadvantages. First, if the passive layer is too thick, the battery will not generate enough current to remove the passive layer. The battery is inoperable and is therefore thrown away. Second, the passive layer presents resistance to the electric pulse. If the passive layer 4 of FIG. 1c is uneven, the current at the anode will be concentrated at the low points of the passive layer. When the battery is discharged, the current concentration will remove only small portions of the passive layer 31, as shown in FIG. 1d. The passive layer will only be removed at disconnected points 31 on the anode 2. This incomplete removal of the passive layer shown in FIG. 1d creates the dangerous conditions of current concentration and anode disconnect.

Figure 2A:
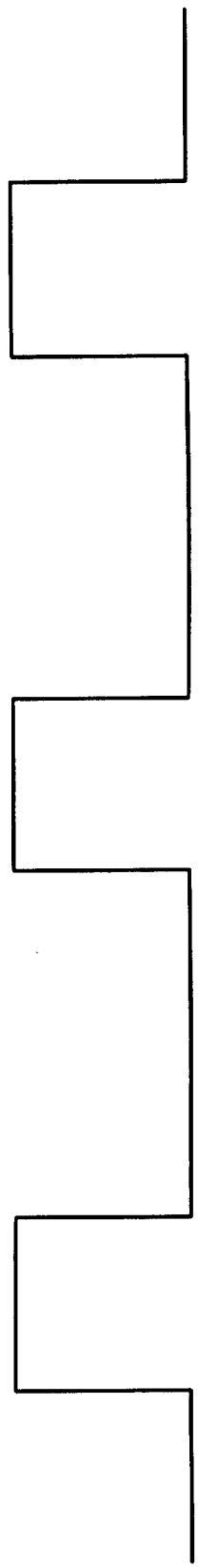
FIG. 2a shows the series of controlled pulses used to remove the passive layer.
Figure 2E:
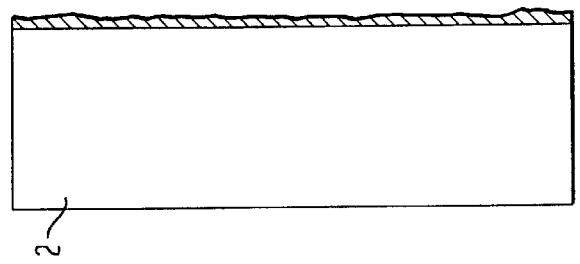
FIGS. 2b–2e show the passive layer being removed from the anode.
Figure 2D:
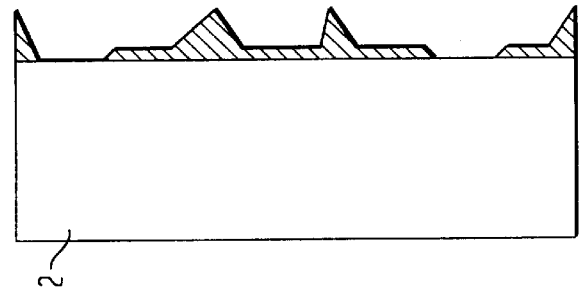
Figure 2C:
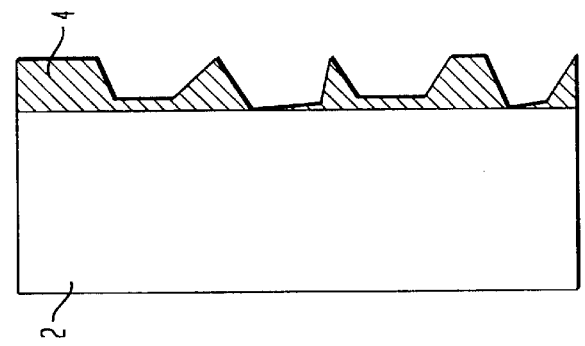
Figure 2B:
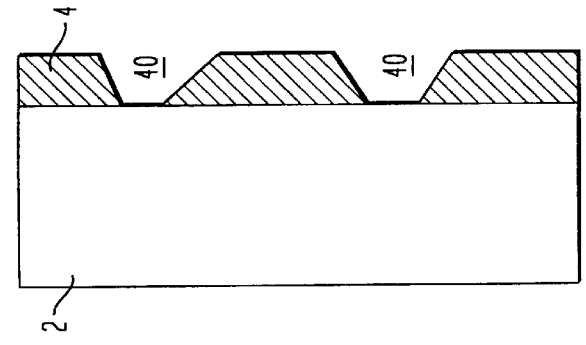

The present invention overcomes the disadvantages of the prior art by providing a controlled series of current pulses to the anode for evenly removing the passive film, as shown in FIG. 2a. Each pulse is capable of removing the passive layer from a portion of the anode, as shown in FIG. 2b. This portion 40 is called the discharge region. Each pulse removes the passive layer from a different portion of the anode. The chemical reaction caused by applying the electric current pulse to the lithium ions on the anode is what removes the passive layer from the discharge region. When the pulses have finished, the passive layer is evenly removed from the anode, thus eliminating the problems of current concentration and anode disconnect.

Each pulse is separated from its succeeding pulse by a resting time period as shown in FIG. 2a. This resting period must be long enough to allow a small passive film to develop on the discharge region, for presenting some resistance to a subsequent pulse. This period must also be short enough for the amount lithium ions in the discharge region to remain reduced due to the previous pulse.

If this resting period is too short, there will be no passive film over the discharge region to provide resistance to the subsequent pulse. The subsequent pulse will simply go through the previous discharge region. Therefore, a short resting period between electric pulses will simply result in current concentration at a single discharge region at the anode, and will prevent the even removal of the passive layer from the anode.

However, this resting period must not be too long. The resting period must be smaller than the amount of time needed for the lithium ions in the discharge region to reach equilibrium with the bulk. Otherwise, if the lithium ions in the discharge region have regenerated, they will act as "fuel" and will react with the subsequent electric pulse. This will also cause a subsequent electric pulse to discharge at this same discharge region, and prevent the even removal of the passive layer from the anode.

An appropriate resting time period will allow the discharge region to develop resistance without regenerating too much lithium ion "fuel," so that the subsequent electric pulses will be discharged at different regions of the anode, thus evenly removing the passive layer from the anode.

An example of a current profile which meets the above requirements is a current that is on for one time period then off for two time periods, and is repeated for four cycles. This profile allows for controlled conditioning of a battery. A single discharge will not provide an even distribution on current due to the nonuniformity of the passive layer. Therefore, an uneven current distribution could result with preferential discharge resulting in the concentrating of current at the anode. The alternating of on and off periods allows for the battery to recover after the discharge, during this recovery a new passive film forms over the portions of the anode used during the previous discharge period. This cycle reduces the concentration of lithium ions in the interface between the anode and electrolyte at locations that previously accommodated the discharge current. During the next discharge period additional areas of the anode will accommodate the discharge current due to the local increase in lithium ions at these regions. The four cycles helps ensure that all areas of the anode are used, enabling controlled depassivation and conditioning on the anode.

Figure 3:
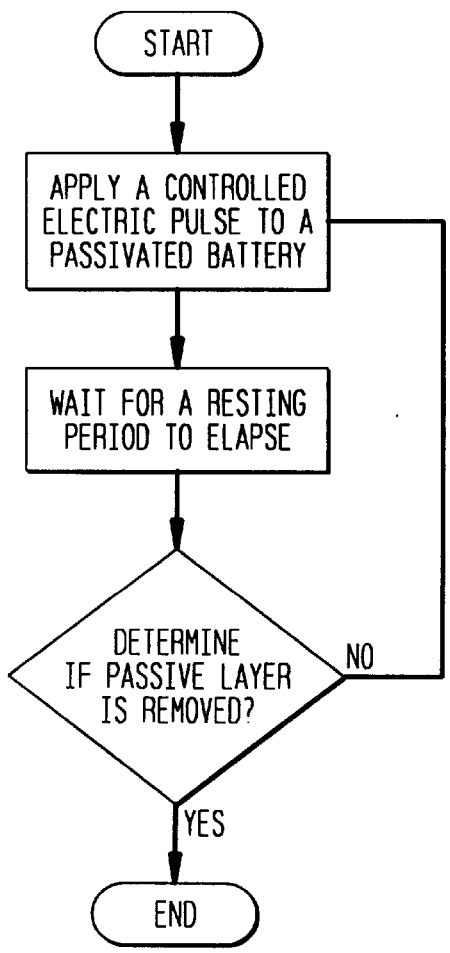
FIG. 3 shows the method of the present invention.

Thus FIG. 3 shows the method of the present invention for removing the passive layer from the anode of a battery. The method includes applying a series of controlled electric pulses to the anode, where each pulse is strong enough for removing a portion of the passive film from the anode. The method also includes separating each pulse for a time period large enough to allow a subsequent electric pulse to discharge at a different region of the anode, and small enough to prevent a discharge region from regenerating enough lithium ion "fuel" to react with subsequent electric pulses. This is achieved by allowing a passive film to partially regrow, but not allowing the regeneration of lithium ions in the discharge region.

The method of the present invention includes any electric pulses separated by any rest period which satisfy the time constraints and the magnitude constraints listed above. An example of a method which satisfies these constraints is applying a series of four electrical pulses to the anode, where each pulse lasts for one minute, as shown in FIG. 2a. The method also includes separating each pulse with a resting period between each pulse of two minutes. FIG. 2b shows that the first pulse removes the passive layer from a portion of the anode at a first discharge region. During the resting period, a small passive layer regrows over the discharge region, and the lithium ions in the region are dissipated as shown in FIG. 2c. The small passive layer creates resistance, and the dissipation of lithium ions removes "fuel" from the region, so that the next electric pulse will discharge at a second region of the anode, removing another portion of the passive layer and creating a second discharge region as shown in FIG. 2d. After four pulses, separated by three resting periods, are applied to the anode, the passive layer is evenly removed from the anode as shown in FIG. 2e.

The present invention also includes a device for generating a series of controlled electric pulses that can remove the passive layer from a battery's anode. Any device which can produce a series of controlled electric pulses separated by a resting time period can be used to implement the method of the claimed invention.

Figure 4:
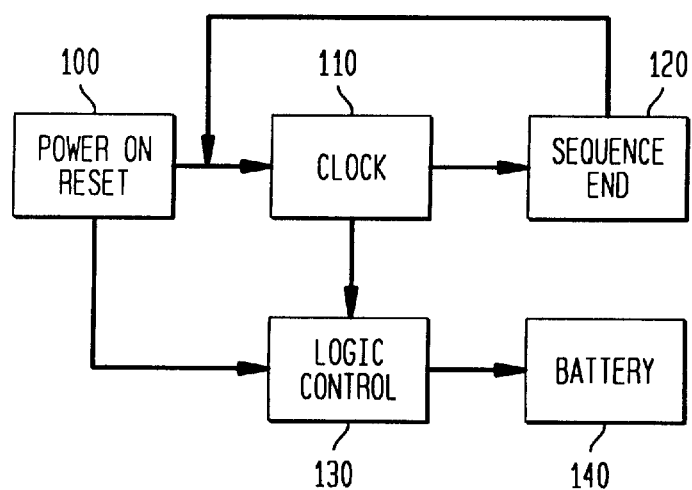
FIGS. 4 and 5 show one embodiment of a device of the present invention.

An example of a device which can be used by the present invention is shown in FIG. 4. The device includes a clock 110 for keeping track of time, and a control logic device 130 for generating and applying the electric pulses, separated by resting periods, to the anode of the battery 140.

Figure 5:
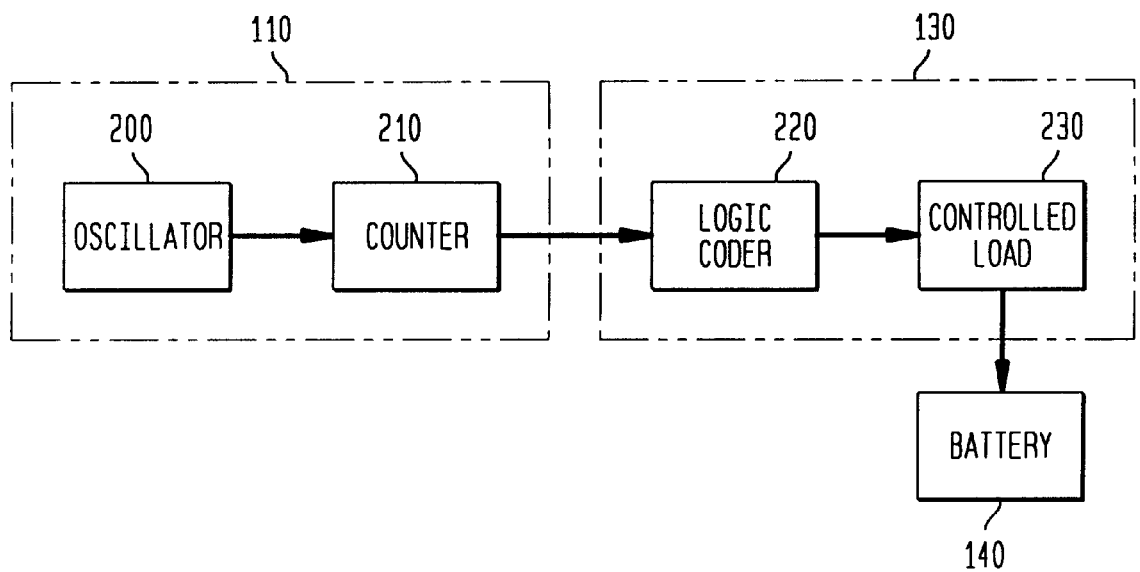

The clock 110 is any device which keeps track of time and outputs a signal after a given time period has elapsed. An example of a clock which may be used by the present invention is shown in FIG. 5. An oscillator 200 generates a periodic signal of pulses, which go into a counter 210. Any counter may be used. The counter simply counts the number of pulses that it receives from the oscillator. The output from the counter is connected to the logic control device 130. If a twelve bit binary counter is used, and the eighth bit is the output which is connected to the logic control device, then the time period used by the logic control device is 128 (2^7) cycles of the oscillator. The bit will change from 0 to 1 after 128 counts, and back to 0 after another 128 counts. If the oscillator is tuned so that it has a frequency of 128 cycles every 30 seconds, then the time period used by the logic control device is 30 seconds. The clock 110 thus outputs a time signal to the logic control device 130 after a given time period, such as 30 seconds, for example, has elapsed.

Figure 7:
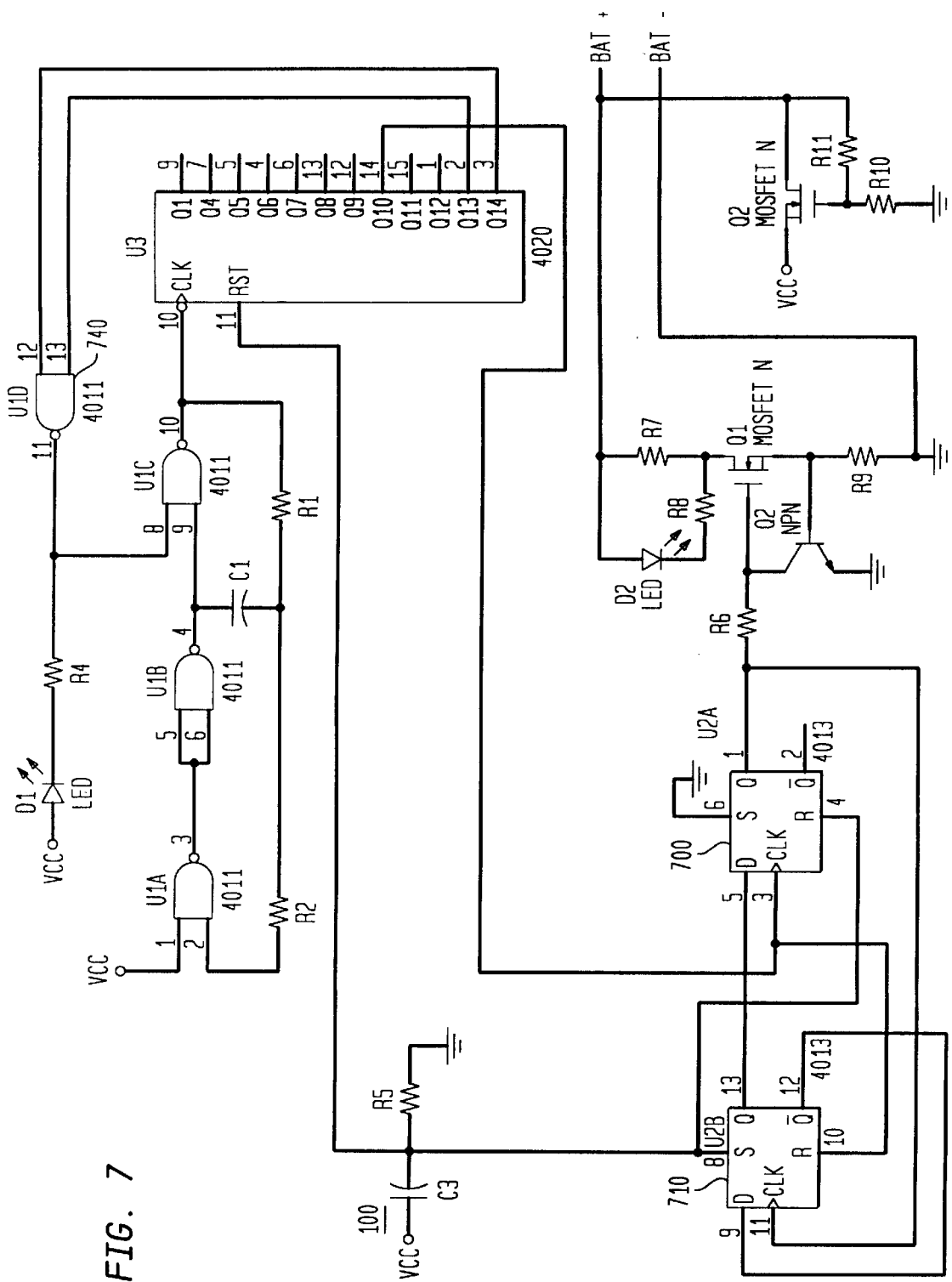
FIGS. 7 and 8 show different embodiments of the device of the present invention.

The logic control device 130 uses the time signal from the clock 110 to generate and apply electric pulses and resting periods to the anode. An example of a logic control device which can implement these functions is shown in FIG. 5. The logic control device includes a logic coder 220 and a controlled load 230. The logic coder can be two flip flops, which are connected as shown in FIG. 7. The flip flops are interconnected so that there is a state change only when a high signal is received from the clock. If the signal from the clock changes state every 30 seconds, then the clock will change to a high state every minute. The flip flops will therefore change state every minute. The output from flip flop 700 is connected to the controlled load. Thus, the current load will apply an electric pulse to the anode only when flip flop 710 is high.

The logic generated by the logic coder is shown in FIG. 6. The initial state of flip flops 700 and 710 are 1, 0. The output from the clock during the initial time period of 30 seconds is 0. After another 30 seconds, the clock signal is 1. The flip flops change state to 0, 1. Because the output of flip flop 710 is high, the controlled load 230 is turned on, and a pulse is sent to the anode. The next clock signal is 0, so the flip flops do not change state. The clock signal then goes to 1, and the flip flops go to 0, 0, because the feedback to flip flop a prevents it from resetting. The output from flip flop b is 0, so the controlled load is turned off. The third high signal resets the state of the flip flops to their original state of 1,0.

This logic can be repeated. For example, the logic cycle can continue for 12 high signals generated by the serial counter. Other than the initial clock timing signal, this sequence establishes the 'high-low' clock cycle timing for the constant current load. The output sequence of the control logic is low, high, low, as shown in FIGS. 2 and 6. For example, if the 'high-low' clock cycle timing is one minute, then the control logic device produces an electric pulse for one minute, followed by a resting period of two minutes.

Figure 8:
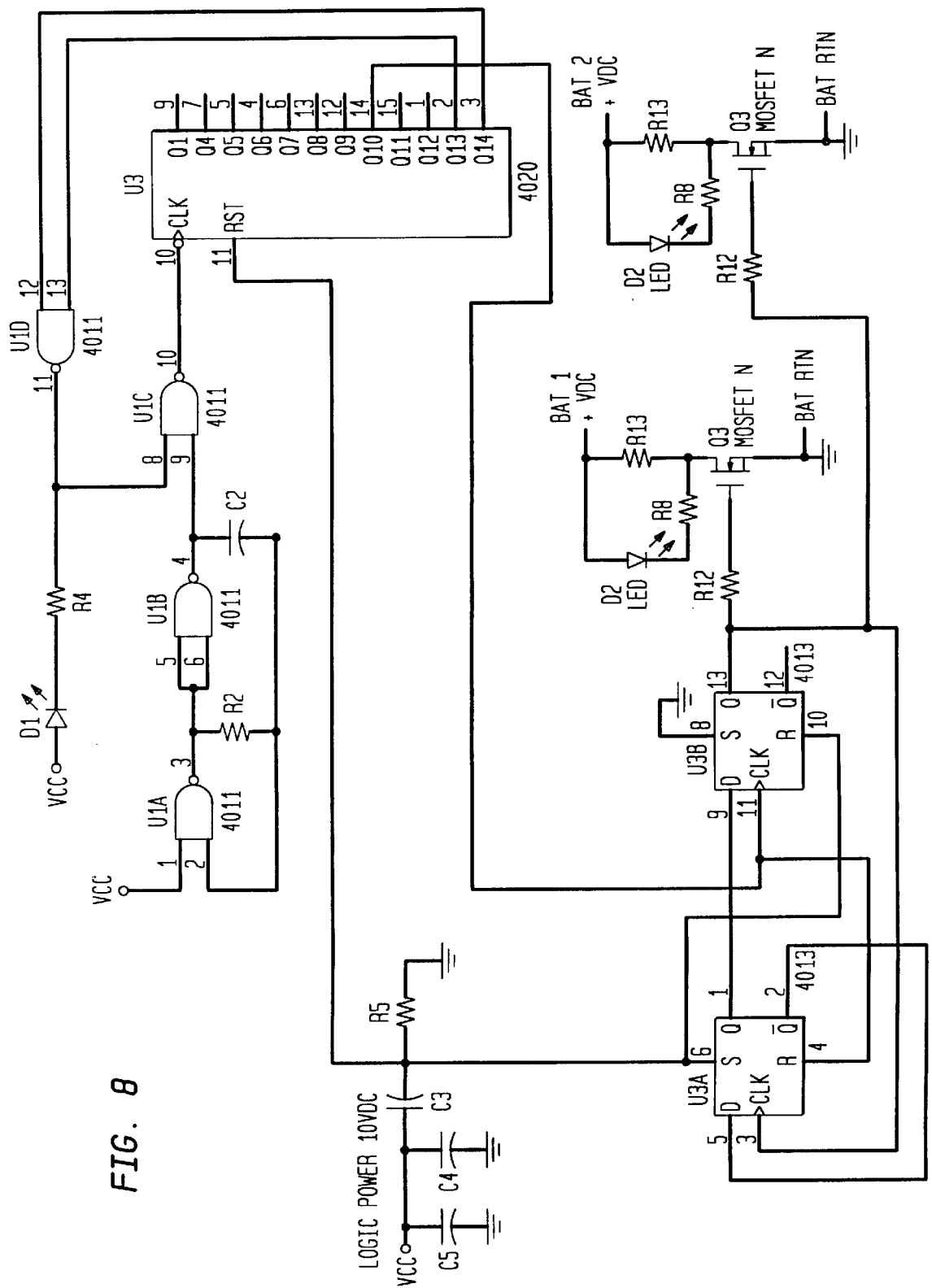

Any device which produces a current after receiving a signal from the logic coder can be used as the controlled load 230. Two examples of the controlled load are shown in FIGS. 7 and 8. FIG. 7 shows a constant current load which is used to remove the passive layer from a single battery. The controlled load uses power mosfet (Q1), and transistor (Q2) sence resistor pair to control the current through a power resistor. When the signal from the coder is low, no current flows through the circuit. When the signal from the coder goes high, the power mosfet allows current to flow though the power resistor equalizing the voltage drop across the transistor and the sence resistor. The transistor and resistor pair are tuned for the current desired.

FIG. 8 shows a constant resistance load which is used for removing the passive layer from multiple batteries. This load uses a mosfet (Q3) and power resistors (R13) to control the current flow from the battery. As with the first design there is no current flow when there is a low signal from the coder. When the signal from the coder is high, the mosfet goes to open and current flows through the power resistors. Both circuits can have a diode and current limiting resistor connected in parallel with the power resistor to indicate when current is flowing.

In addition, the device for performing the method of FIG. 3 may also include a sequence end device 120, as shown in FIG. 4. The sequence end device simply ends the depassivation process. For example, if four pulses are used to remove the passive layer from the anode, then the sequence end circuit will turn off the depassivation device after four pulses are sent to the anode. An example of a sequence end device 120 is the nand gate 740 shown in FIG. 7. The two most significant bits of the 12 bit binary counter are used as inputs to the sequence end circuit. When the $11^{th}$ and $12^{th}$ bits of the counter are high, both inputs to the nand gate are high. The nand gate then disables the clock circuit, and allows current to flow through the light emitting diode, which indicates that the depassivation process is finished. Any device which ends the depassivation process can be used as the sequence end device in the present invention.

The present invention may also include a power on reset circuit 100 for resetting the counter to zero, resetting the logic coder to its initial state, and resetting the sequence end device. An example of a power on reset circuit is shown in FIG. 7. FIG. 7 shows the capacitor (C3) resistor (R5) power on reset circuit.

FIG. 7 shows the power conditioner 750, which is used in the independent battery depassivation circuit. This circuit uses a mosfet (Q4) and voltage dividing resistors to supply power to the circuit.

FIG. 8 shows the power conditioning capacitors (C4, C5) used for voltage smoothing when independent logic power is used.

The method of the present invention may also be performed by a computer software program which is implemented on a general purpose computer. The software program can be stored in a computer readable medium. The program, when implemented by a computer, causes the computer to perform the functions shown in FIG. 3, so that the computer outputs the logic signals shown in FIGS. 2 and 6. In other words, the functions performed by the hardware circuits, such as the clock, the logic coder, and the sequence end circuit, can easily be implemented in software.

The logic signals produced by the software implemented in a general purpose computer can then be used to turn the power to a controlled load on and off, so that the controlled load sends the proper electric pulses separated by resting time periods to the anode of a battery. Thus, the passive layer is removed from the anode.

I claim:

1. A method for evenly removing a passive layer from a battery anode, comprising the steps of:

discharging a fixed number of controlled electric pulses through the anode to remove a portion of the layer in one region of the anode with each pulse; and providing for a fixed period resting time between consecutive pulses, during which the layer is partially restored in the anode region through which the previous pulse discharged while ion concentration over that anode region is reduced.

2. The method of claim 1 wherein each fixed period of resting time is twice the duration of the previous pulse discharge.

3. The method of claim 2 wherein the duration of each pulse discharge is one minute and the duration of each period of resting time is two minutes.

4. The method of claim 1 wherein the fixed number of controlled electric pulses is four.

5. A device for evenly removing a passive layer from a battery anode, comprising:

a clock to track time; and a logic means driven by the clock for discharging a fixed number of controlled electric pulses through the anode to remove a portion of the layer in one region of the anode, with consecutive pulses being separated by a fixed period resting time to partially restore the layer in the anode region through which the previous pulse discharged while reducing ion concentration over that anode region.

6. The device of claim 5 wherein a pulse sequence ending circuit is included to disable the clock after the fixed number of controlled electric pulses have passed through the anode.

7. The device of claim 6 wherein output from a nand gate is directed to disable the clock.

8. The device of claim 5 wherein the clock is an oscillator that drives a counter which drives the logic means.

9. The device of claim 5 wherein the logic means includes;

a logic coder having two flip flops which are interconnected so as to only produce an output signal when the clock output is high; and a controlled load connected to receive the output signal from the flip flops and respond thereto by passing one electric pulse to the anode.

10. The device of claim 9 wherein a power mosfet and a transistor/sence resistor combination are interconnected in the controlled load to pass current through a power resistor when generating the electric pulse.

\* \* \* \* \*